United States Patent [19]

Yamamoto et al.

[11] Patent Number: 5,391,647
[45] Date of Patent: Feb. 21, 1995

[54] COMPOSITE COMPOSITION HAVING HIGH TRANSPARENCY AND PROCESS FOR PRODUCING SAME

[75] Inventors: Naoki Yamamoto; Hiroki Hatakeyama; Hiroyuki Watanabe, all of Otake, Japan

[73] Assignee: Mitsubishi Rayon Co., Ltd., Tokyo, Japan

[21] Appl. No.: 920,426

[22] PCT Filed: Dec. 27, 1991

[86] PCT No.: PCT/JP91/01782

§ 371 Date: Aug. 20, 1992

§ 102(e) Date: Aug. 20, 1992

[87] PCT Pub. No.: WO92/12204

PCT Pub. Date: Jul. 23, 1992

[30] Foreign Application Priority Data

Dec. 28, 1990 [JP] Japan .................. 2-415510
Mar. 14, 1991 [JP] Japan .................. 3-073602
Mar. 14, 1991 [JP] Japan .................. 3-073732

[51] Int. Cl.⁶ .................. C08L 33/02; C08L 83/10
[52] U.S. Cl. .................. 525/479; 528/26; 524/832
[58] Field of Search .................. 525/479, 63; 528/26; 524/532

[56] References Cited

U.S. PATENT DOCUMENTS

| | | |
|---|---|---|
| 4,330,446 | 5/1982 | Miyosawa . |
| 4,455,205 | 6/1984 | Olson et al. . |
| 4,491,508 | 1/1985 | Olson et al. . |
| 4,624,971 | 11/1986 | Van Tao et al. .................. 525/479 |
| 4,690,986 | 9/1987 | Sasaki et al. .................. 525/479 |
| 4,889,876 | 12/1989 | Yamamoto .................. 522/135 |
| 4,994,523 | 2/1991 | Sasaki et al. .................. 525/479 |
| 5,064,877 | 11/1991 | Nass et al. . |

FOREIGN PATENT DOCUMENTS

| | | |
|---|---|---|
| 0078548 | 11/1982 | European Pat. Off. . |
| 0287877 | 10/1988 | European Pat. Off. . |
| 0315836 | 5/1989 | European Pat. Off. . |
| 0325875 | 8/1989 | European Pat. Off. . |
| 0402466 | 12/1990 | European Pat. Off. . |
| 0460560 | 12/1991 | European Pat. Off. . |
| 53-11952 | 2/1978 | Japan . |
| 59-71316 | 4/1984 | Japan . |
| 59-204669 | 11/1984 | Japan . |
| 61-221211 | 10/1986 | Japan . |
| 62-89764 | 4/1987 | Japan . |
| 2-225509 | 9/1990 | Japan . |
| 2089826 | 10/1989 | United Kingdom . |

*Primary Examiner*—Ralph H. Dean
*Attorney, Agent, or Firm*—Oblon, Spivak, McClelland, Maier, & Neustadt

[57] ABSTRACT

Disclosed is a composite composition consisting essentially of a silica polycondensate (A) formed by hydrolysis and polycondensation of one or more alkoxysilane compounds, and a polymer (B) of a radical-polymerizable vinyl compound (B') composed chiefly of at least one monomer selected from the group consisting of acrylic acid, methacrylic acid, acrylic esters and methacrylic esters, the silica polycondensate (A) and the polymer (B) of the vinyl compound (B') being intermingled homogeneously. This composite composition is produced by dissolving the silica polycondensate (A) in the vinyl compound (B') and effecting radical polymerization of the vinyl compound (B'). This composite composition has high transparency, rigidity, toughness and thermal resistance and is hence useful in fields of application where inorganic glass has heretofore been used.

5 Claims, No Drawings

COMPOSITE COMPOSITION HAVING HIGH TRANSPARENCY AND PROCESS FOR PRODUCING SAME

TECHNICAL FIELD

This invention relates to composite compositions having high transparency, rigidity, toughness and thermal resistance, and to a process for producing the same.

BACKGROUND ART

Acrylic resins are being used in glazing applications such as windowpanes because of their high transparency. However, acrylic resins inherently have low rigidity, hardness and thermal resistance, and are hence less than satisfactory.

In an attempt to overcome this disadvantage, many investigations have heretofore been made on the formation of composite materials consisting of acrylic resins and inorganic substances. For example, there have been proposed a number of methods in which a dispersion of a silica compound (formed by polycondensation of an alkoxysilane) or colloidal silica in an acrylic resin solution is used as a coating film for hardening the surfaces of plastic substrates (see, for example, Japanese Patent Laid-Open Nos. 11952/'78 and 11989/'78).

However, when such a composite material is coated on plastic substrates, a coating film having high hardness and high wear resistance is obtained, but no substantial improvement in rigidity can be expected. Moreover, good transparency is obtained at coating film thicknesses of the order of several tens of microns, but a marked reduction in transparency results at greater coating film thicknesses.

On the other hand, it is described in J. Mater. Res., Vol. 4, p. 1018 (1989) that a silica gel-polymethyl methacrylate composite material is obtained by impregnating porous silica gel having a controlled pore diameter with methyl methacrylate and then polymerizing the latter. However, this method has the disadvantage that it involves troublesome steps and is not suitable for industrial purposes and that it is difficult to subject the resulting composite material to postworking.

DISCLOSURE OF THE INVENTION

It is an object of the present invention to provide an organic polymer to which high rigidity and high thermal resistance have been imparted without impairing the high transparency, high toughness, low specific gravity and good workability inherently possessed by acrylic resins.

According to the present invention, there is provided a composite composition consisting essentially of (A) a silica polycondensate formed by hydrolysis and polycondensation of one or more silane compounds of the general formula

$$SiR^1{}_aR^2{}_b(OR^3)_c \qquad (I)$$

where $R^1$ and $R^2$ are hydrocarbon radicals of 1 to 10 carbon atoms which may contain an ether linkage or ester linkage, $R^3$ is a hydrogen atom or a hydrocarbon radical of 1 to 10 carbon atoms, a and b are whole numbers of 0 to 3, and c is equal to $(4-a-b)$ and represents a whole number of 1 to 4; and (B) a polymer of a radical-polymerizable vinyl compound (B') composed chiefly of one or more monomers selected from the group consisting of acrylic acid, methacrylic acid, acrylic esters and methacrylic esters;

the components (A) and (B) being intermingled homogeneously.

BEST MODE FOR CARRYING OUT THE INVENTION

Since the composite compositions of the present invention form a semi-interpenetrating network structure in which the silica skeleton of a silica polycondensate (A) formed by hydrolysis and polycondensation of an alkoxysilane compound and a polymer (B) of a radical-polymerizable vinyl compound (B') are intermingled on a molecular level, they have the very striking feature that they exhibit very high rigidity, toughness and thermal resistance, as well as high transparency.

The radical-polymerizable vinyl compound (B') used in the present invention is composed chiefly of one or more monomers selected from the group consisting of acrylic acid, methacrylic acid, acrylic esters and methacrylic esters. Useful acrylic or methacrylic esters (hereinafter referred to briefly as (meth)acrylic esters) include, for example, alkyl esters of (meth)acrylic acid such as methyl (meth)acrylate, ethyl (meth)acrylate, propyl (meth)acrylate, butyl (meth)acrylate and 2-ethylhexyl (meth)acrylate; and hydroxyl-containing alkyl esters of (meth)acrylic acid such as 2-hydroxyethyl (meth)acrylate and 2-hydroxypropyl (meth)acrylate. In the radical-polymerizable vinyl compound (B'), at least one monomer selected from these (meth)acrylic acid and (meth)acrylic esters should preferably be present in an amount of not less than 50% by weight and more preferably in an amount of not less than 70% by weight. Among (meth)acrylic acid and (meth)acrylic esters, methacrylic esters such as methyl methacrylate, ethyl methacrylate and 2-hydroxyethyl methacrylate are preferred, and methyl methacrylate and 2-hydroxyethyl methacrylate are especially preferred.

In the present invention, certain compounds other than (meth)acrylic acid and (meth)acrylic esters may be used as components of the radical-polymerizable vinyl compound (B'). They are compounds which are copolymerizable with the above-described (meth)acrylic esters and the like. Such compounds include, for example, unsaturated carboxylic acids such as maleic acid and itaconic acid; acid anhydrides such as maleic anhydride and itaconic anhydride; maleimide derivatives such as N-phenylmaleimide, N-cyclohexylmaleimide and N-t-butylmaleimide; nitrogen-containing monomers such as acrylamide, methacrylamide, acrylonitrile, methacrylonitrile, diacetone acrylamide and dimethylaminoethyl (meth)acrylate; epoxy-containing monomers such as allyl glycidyl ether and glycidyl (meth)acrylate; aromatic vinyl compounds such as styrene and α-methylstyrene; and multifunctional monomers such as ethylene glycol di(meth)acrylate, allyl (meth)acrylate, divinylbenzene and trimethylolpropane tri(meth)acrylate. These compounds may be used alone or in combination,. In the radical-polymerizable vinyl compound (B'), these compounds are preferably used in an amount of not greater than 50% by weight and more preferably in an amount of not greater than 30% by weight.

Moreover, vinyl compounds having in the molecule at least one group reactive with the silanol groups contained in the silica polycondensate (A) (i.e., at least one functional group selected from the class consisting of hydroxyl, carboxyl, halogenated silyl and alkoxysilyl groups) function to further improve some properties (such as rigidity, toughness and thermal resistance) of the resulting composite composition. Accordingly, it is preferable that such a vinyl compound be contained as a component of the radical-polymerizable vinyl compound (B').

Such vinyl compounds having a reactive group in the molecule include, for example, 2-hydroxyethyl (meth)acrylate, 2-hydroxypropyl (meth)acrylate, (meth)acrylic acid, vinyltrichlorosilane, vinyltrimethoxysilane and γ-methacryloyloxypropyltrimethoxysilane. Among these vinyl compounds, 2-hydroxyethyl methacrylate, methacrylic acid, vinyltrichlorosilane, vinyltrimethoxysilane and γ-methacryloyloxypropyltrimethoxysilane are especially preferred.

The silica polycondensate (A) used in the present invention is a product obtained by hydrolysis and polycondensation of one or more silane compounds of the general formula

$$SiR^1_a R^2_b (OR^3)_c \quad (I)$$

where $R^1$ and $R^2$ are hydrocarbon radicals of 1 to 10 carbon atoms which may contain an ether linkage or ester linkage, $R^3$ is a hydrogen atom or a hydrocarbon radical of 1 to 10 carbon atoms, a and b are whole numbers of 0 to 3, and c is equal to $(4-a-b)$ and represents a whole number of 1 to 4. During this reaction, most of the $OR^3$ groups contained in the silane compounds are hydrolyzed, but some $OR^3$ groups still remain on the outer surfaces of the silica polycondensate (A). Therefore, the silica polycondensate (A) dissolves in the radical-polymerizable vinyl compound (B').

The silane compounds which are within the scope of the general formula (I) and useful in the present invention can be divided into silane compounds (A-1) in which c has a value of 4, and silane compounds (A-2) in which c has a value of 1 to 3. More specifically, the silane compounds (A-1) are represented by the general formula

$$Si(OR^3)_4 \quad (II)$$

where $R^3$ is as previously defined, and the silane compounds (A-2) are represented by the general formula

$$SiR^1_a R^2_b (OR^3)_d \quad (III)$$

where $R^1$, $R^2$, $R^3$, a and b are as previously defined, and d is equal to $(4-a-b)$ and represents a whole number of 1 to 3. In this case, it is preferable to use 1 to 100 parts by weight, more preferably 20 to 100 parts by weight, of a silane compound (A-1) and 0 to 99 parts by weight, more preferably 0 to 80 parts by weight, of a silane compound (A-2). If the silane compound (A-1) is used in smaller amounts, it is difficult to obtain a composite composition having high rigidity and high thermal resistance as desired in the present invention, probably because the resulting silica polycondensate fails to produce a well-developed three-dimensional network structure. Most preferably, the silane compounds (A-1) and (A-2) are used in amounts of 50 to 100 parts by weight and 0 to 50 parts by weight, respectively.

The silane compounds (A-1) which can be used in the present invention include, for example, tetramethoxysilane, tetraethoxysilane, tetra-n-propoxysilane, tetraisopropoxysilane, tetra-n-butoxysilane, tetrahexyl orthosilicate, tetraoctyl orthosilicate, tetraphenyl orthosilicate and tetrabenzyl orthosilicate. These silane compounds (A-1) may be used alone or in combination. Among them, tetramethoxysilane and tetraethoxysilane are preferably used.

The silane compounds (A-2) which can be hydrolyzed and polycondensed together with the silane compounds (A-1) include, for example, methyltrimethoxysilane, methyltriethoxysilane, ethyltrimethoxysilane, ethyltriethoxysilane, phenyltrimethoxysilane, phenyltriethoxysilane, vinyltrimethoxysilane, vinyltriethoxysilane, γ-glycidoxypropyltrimethoxysilane, γ-methacryloyloxypropyltrimethoxysilane, acetoxyethyltriethoxysilane, dimethyldimethoxysilane, diphenyldimethoxysilane, methylethyldiethoxysilane, methylphenyldimethoxysilane, methoxyethyltriethoxysilane and trimethylmethoxysilane. These silane compounds (A-2) may be used alone or in combination. Among them, methyltrimethoxysilane, methyltriethoxysilane, vinyltrimethoxysilane and γ-methacryloyloxypropyltrimethoxysilane are preferably used. Especially where vinyltrimethoxysilane and γ-methacryloyloxypropyltrimethoxysilane are used, the resulting silica polycondensate (A) itself has polymerizable vinyl groups, so that it copolymerizes with the radical-polymerizable vinyl compound (B') to form chemical bonds therebetween. These chemical bonds serve to reinforce the interface between the polymer (B) of the radical-polymerizable vinyl compound and the silica polycondensate (A), thus improving the properties of the composite composition of the present invention.

In order to form the silica polycondensate (A) by hydrolysis and polycondensation of a silane compound, the silane compound may be used alone or in combination with a minor amount of a component co-condensable therewith. Useful components co-condensable with silane compounds include, for example, metallic alkoxides, organic metallic salts and metallic chelates. Such co-condensable components are preferably used in an amount of 0 to 100 parts by weight, more preferably 0 to 50 parts by weight, per 100 parts by weight of the silane compound.

Specific examples of such co-condensable metallic alkoxides, organic metallic salts and metallic chelates include titanium tetraethoxide, titanium tetraisopropoxide, zirconium tetraethoxide, zirconium tetra-n-butoxide, aluminum triisopropoxide, zinc acetylacetonate, lead acetate and barium oxalate.

In the hydrolysis and polycondensation reaction of a silane compound, water needs to be present in the reaction system. Generally, the proportion of water present in the reaction system exerts no significant influence on the reaction rate. However, if the amount of water is extremely small, the hydrolysis is too slow to form a polycondensate. If the reaction is carried out by using water in an amount of greater than 50% by weight based on the total weight of the reaction system, the resulting silica polycondensate (A) solution is unstable and liable to premature gelation, so that the radical-polymerizable vinyl compound (B') cannot be easily charged thereinto later. More preferably, water is used in an amount of not greater than 20% by weight.

In the hydrolysis reaction of a silane compound, an inorganic or organic acid can be used as a catalyst. Useful inorganic acids include, for example, hydrohalogenic acids (such as hydrochloric acid, hydrofluoric acid and hydrobromic acid), sulfuric acid, nitric acid and phosphoric acid. Useful organic acids include, for example, formic acid, acetic acid, oxalic acid, acrylic acid and methacrylic acid.

This catalyst can be used in an amount of 0.001 to 10 parts by weight per 100 parts by weight of the silane compound, though the amount of catalyst used depends on the strength of the acid. If the amount of catalyst used is less than 0.001 part by weight, the silane compound is not fully hydrolyzed and, therefore, the desired polycondensate may not be obtained. If the amount of catalyst used is greater than 10 parts by weight, no additional benefit is derived.

In order to effect the reaction mildly and uniformly, a solvent is used in the reaction system for the hydrolysis of a silane compound. It is desirable that the solvent allows the reactant (i.e., silane alkoxide), water and the catalyst to be intermixed. Useful solvents include, for example, water; alcohols such as methyl alcohol, ethyl alcohol and isopropyl alcohol; ketones such as acetone; and ethers such as tetrahydrofuran and dioxane.

No particular limitation is placed on the amount of solvent used, so long as the reactant can be dissolved homogeneously. However, if the concentration of the reactant is too low, the reaction rate may become unduly slow. The hydrolysis and polycondensation reaction of a silane compound is usually carried out at a temperature ranging from room temperature to 120° C. for a period of 30 minutes to 24 hours, and preferably at a temperature ranging from room temperature to the boiling point of the solvent for a period of 1 to 10 hours. It is important that, even after completion of the reaction, the formed silica polycondensate is left dissolved in the solvent. If the polycondensation is allowed to proceed until the silica polycondensate separates out as a solid from the solvent, or the solvent is distilled off, the silica polycondensate (A) cannot be dissolved in the radical-polymerizable vinyl compound (B') at the time of subsequent polymerization, so that the silica polycondensate (A) and the polymer (B) of the radical-polymerizable vinyl compound (B') are not homogeneously intermingled on a molecular level. Thus, it is difficult to obtain a composite composition having excellent properties as desired in the present invention.

In the silica polycondensate (A) obtained in the above-described manner, there may be used a silica polycondensate whose silanolic hydroxyl groups and-/or alkoxy groups have been replaced by a vinyl compound (C-1) having a hydroxyl compound or a vinyl compound (C-2) having a carboxyl group. These vinyl compounds (C-1) and (C-2) will hereinafter be referred to collectively as modifying compounds.

No particular limitation is placed on the type of modifying compound used, so long as the modifying compound can replace the silanolic hydroxyl groups and/or alkoxy groups of the silane polycondensate (A) by means of its hydroxyl or carboxyl group.

Specific examples of the vinyl compound (C-1) having a hydroxyl group include allyl alcohol, methallyl alcohol, 2-hydroxyethyl (meth)acrylate and 2-hydroxypropyl (meth)acrylate. Specific examples of the vinyl compound (C-2) having a carboxyl group include (meth)acrylic acid, crotonic acid, itaconic acid and maleic anhydride. The foregoing vinyl compounds (C-1) and (C-2) may be used alone or in combination.

In order to replace the silanolic hydroxyl groups and/or alkoxy groups of the silica polycondensate (A) by a modifying compound, it is a common practice to add the modifying compound to the reaction solution which has gone through the hydrolysis and polycondensation reaction and hence contains the silica polycondensate (A). The replacement reaction is usually carried out at a temperature ranging from room temperature to 120° C. for a period of 30 minutes to 24 hours, and preferably at a temperature ranging from room temperature to the boiling point of the solvent for a period of 1 to 10 hours.

The modifying compound may be added in excess to the reaction system. If the modifying compound is added in excess, the replacement reaction proceeds smoothly. Even if some unreacted modifying compound remains in the silica polycondensate (A) solution and cannot be removed at the time of distilling off of the solvent, such unreacted modifying compound copolymerizes with the radical-polymerizable vinyl compound (B') and hence exerts no adverse influence on the properties of the composite composition of the present invention.

The modifying compound introduced into the silica polycondensate (A) in the above-described manner has the effect of improving the bonding properties of the interface between the inorganic polymer (i.e., the silica polycondensate (A)) and the organic polymer (i.e., the polymer of the compound (B')). During subsequent polymerization for the formation of a composite composition, the silica polycondensate (A) undergoes further hydrolysis and polycondensation to produce a higher degree of three-dimensional network structure. On this occasion, the decomposition products arising from the modifying compound are incorporated into the polymer derived from the radical-polymerizable vinyl compound (B'), instead of providing volatile components. Accordingly, use of the modifying compound has the advantage that the resulting composite composition does not suffer from volume shrinkage, cracking, fracture or other defect which is caused by volatilization of the alcohol formed as a by-product during further polycondensation of the silica polycondensate (A), thus making it possible to produce substantially thick articles successfully.

If a silica polycondensate (A) is formed by using only a vinyl compound-substituted silane alkoxide resulting from reaction with the above-described modifying compound, as the silane compound being a monomer for the polycondensation reaction, the silica content of the resulting silica polycondensate is about 14% by weight at the best. However, if a silica polycondensate (A) is first formed from a silane compound represented by the general formula (I) and used after having been subjected to replacement reaction with the modifying compound, the silica content of the resulting composite composition can be increased to 15% by weight or greater and further to 20% by weight or greater. Thus, there can be produced composite compositions having a high silica content.

The composite compositions of the present invention comprise a silica polycondensate (A) and a polymer (B) of a radical-polymerizable vinyl compound (B'), both components being intermingled on a molecular level. The proportions of the silica polycondensate (A) and the polymer (B) of the radical-polymerizable vinyl compound (B') in the composite compositions are preferably chosen so that the components (A) and (B) are present in amounts of 1 to 99% by weight and 99 to 1% by weight, respectively. More preferably, the components (A) and (B) are used in amounts of 10 to 90% by weight and 90 to 10% by weight, respectively. Most preferably, the components (A) and (B) are used in amounts of 70 to 20% by weight and 30 to 80% by weight, respectively. Especially when the silica polycondensate (A) is used in an amount of 70 to 20% by weight, the properties desired in the present invention are manifested to a full degree.

Although no particular limitation is placed on the method by which the composite compositions of the present invention are produced, it is preferable to produce them according to the conventionally known cast polymerization process. By way of example, the cast polymerization process starts with mixing a silica polycondensate (A) with a radical-polymerizable vinyl compound (B') in the form of a monomer or a partial polymer. The solvent and water remaining in this mixture are distilled off to obtain a mixed solution comprising the component (A) dissolved in the component (B'). Then, a casting material is prepared by adding a radical polymerization initiator to the mixed solution. More specifically, both components are mixed, for example, by mixing the component (B') directly with a solution of the silica polycondensate (A) in a suitable solvent and then removing the solvent and water associated with the component (A), or by adding the component (B') to a solution of the silica polycondensate while removing therefrom the solvent and water associated with the component (A). In other words, it is important that a mixed solution comprising both components is prepared without causing the component (A) to separate out as a solid. It is to be understood that the above-described mixed solution can have any viscosity, so long as the component (A) is homogeneously dissolved in the component (B'). For example, the mixed solution may have the form of a gel-like material.

The radical polymerization initiators which can be used for this purpose include, for example, azo compounds such as 2,2'-azobisisobutyronitrile, 2,2'-azobis(2,4-dimethylvaleronitrile) and 2,2'-azobis(2,4-dimethyl-4-methoxyvaleronitrile); organic peroxides such as benzoyl peroxide and lauroyl peroxide; and redox polymerization initiators.

This casting material can be cast-polymerized by the so-called cell casting process in which a cell is formed by two surface-treated inorganic glass or metal plates disposed in opposed relationship and sealed with a gasket at their periphery, and the casting material is poured into the cell and heated; or the continuous casting process in which a casting space is defined by two stainless steel endless belts having one mirror-polished surface and traveling in the same direction at the same speed, and two gaskets disposed along the edges of the belts, and the above-described casting material is continuously poured into the casting space from the upstream side and heated. The polymerization temperature at which a composite composition in accordance with the present invention is formed is usually within the range of 10° to 150° C. However, it is preferable to form a composite composition by effecting polymerization of the radical-polymerizable vinyl compound (B') and further polycondensation of the silica polycondensate (A) concurrently at a temperature above room temperature, i.e., within the range of 40° to 150° C.

Furthermore, in any convenient step of the present process, various additives such as colorants, ultraviolet absorbers, thermal stabilizers and mold releasing agents may be added to the composite composition in such amounts as not to impair the effects of the present invention.

Even when the $SiO_2$ content is 15% by weight or greater, the composite compositions of the present invention have a haze of not greater than 5% or, in most cases, not greater than 3% as measured at a plate thickness of 3 mm. This is one of the most striking features of the present invention. In electron micrographs, no fine particle of silica is observed even at a magnification of 200,000 diameters. This means that, in the composite compositions of the present invention, the silica polycondensate (A) and the polymer (B) of the radical-polymerizable vinyl compound (B') are intermingled on a molecular level. In the case of acrylic resins having ordinary fine particles of silica dispersed therein, the fine particles of silica are clearly recognized in electron micrographs at a magnification of the order of several thousand diameters. When the $SiO_2$ content is 15% by weight or greater, such composite materials have a haze of greater than 20% as measured at a plate thickness of 3 mm and show a marked reduction in transparency. It can be seen from the foregoing description that, as contrasted with acrylic resins having ordinary fine particles of silica dispersed therein, the composite compositions of the present invention have surprising effects which have not been known in the prior art.

The present invention is more specifically explained with reference to the following examples. However, it is to be understood that the present invention is not limited thereto. In these examples and comparative examples, all parts are by weight unless otherwise stated.

Properties of the resulting composite compositions were evaluated according to the following methods: Transparency was evaluated by using an integrating sphere type haze meter (SEP-H-SS; manufactured by Japan Precision Optics Co., Ltd.) to measure the total light transmittance and haze of a sample according to ASTM D1003. Thermal resistance was evaluated by annealing a sample and then measuring its heat distortion temperature (HDT) according to ASTM D648. Strength was evaluated by annealing a sample at 130° C. for 60 hours and then making a bending test of the sample according to ASTM D790 to determine its flexural breaking strength and flexural modulus of elasticity. The $SiO_2$ content of a sample was determined by calcining the sample in a crucible and calculating its $SiO_2$ content from the weight of the residue.

EXAMPLE 1

A glass flask fitted with agitating blades was charged with 832 parts of tetraethoxysilane and 800 parts of ethanol. While the contents of the flask were being stirred, 144 parts of deionized water and 4 parts of 36 wt. % hydrochloric acid were added thereto and the temperature was raised to 70° C.

After 2 hours, the volatile components (i.e., the solvent and water) were distilled off at 40° C. under reduced pressure by means of a rotary evaporator, while methyl methacrylate (hereinafter abbreviated as MMA) was added at the same rate as the volatile components were distilled off. Finally, the solvent was completely replaced by MMA and the resulting mixture was concentrated to a total amount of 800 parts. Thus, there was obtained a mixed solution.

Then, 0.1 part of 2,2'-azobisisobutyronitrile (hereinafter abbreviated as AIBN) as a polymerization initiator was added to and dissolved in 200 parts of the above mixed solution. After the mixed solution was exposed to reduced pressure in order to remove any dissolved air, it was poured into a cell formed by a gasket and two stainless steel plates and adjusted previously so as to have a thickness of 3 mm. Subsequently, the mixed solution was polymerized at 80° C. for 5 hours and then at 120° C. for 2 hours to obtain a cast plate. Properties of this cast plate were evaluated and the results thus obtained are shown in Table 1.

EXAMPLE 2

A glass flask fitted with agitating blades was charged with 832 parts of tetraethoxysilane and 800 parts of ethanol. While the contents of the flask were being stirred, 144 parts of deionized water and 4 parts of 36 wt. % hydrochloric acid were added thereto and the temperature was raised to 70° C. After 2 hours, 450 parts by weight of 2-hydroxyethyl methacrylate (hereinafter abbreviated as HEMA) was added. The volatile components (i.e., the solvent and water) were distilled off in the same manner as described in Example 1, while MMA was added until the solvent was completely replaced by MMA. The resulting mixture was concentrated to a total amount of 1,100 parts. Thus, there was obtained a mixed solution.

Then, 0.1 part of AIBN was added to and dissolved in 300 parts of the above mixed solution. Thereafter, the mixed solution was polymerized in all the same manner as described in Example 1 to obtain a cast plate. Properties of this cast plate were evaluated and the results thus obtained are shown in Table 1.

EXAMPLE 3

A glass flask fitted with agitating blades was charged with 832 parts of tetraethoxysilane, 80 parts of γ-methacryloyloxypropyltrimethoxysilane and 800 parts of ethanol. While the contents of the flask were being stirred, 160 parts of deionized water and 4 parts of 36 wt. % hydrochloric acid were added thereto and the temperature was raised to 70° C. After 2 hours, the solvent was completely replaced by MMA in the same manner as described in Example 1, and the resulting mixture was concentrated to a total amount of 800 parts. Thus, there was obtained a mixed solution.

Then, 0.1 part of AIBN was added to and dissolved in 200 parts of the above mixed solution. Thereafter, the mixed solution was polymerized in all the same manner as described in Example 1 to obtain a cast plate. Properties of this cast plate were evaluated and the results thus obtained are shown in Table 1.

EXAMPLE 4

A glass flask fitted with agitating blades was charged with 832 parts of tetraethoxysilane and 800 parts of ethanol. While the contents of the flask were being stirred, 144 parts of deionized water and 4 parts of 36 wt. % hydrochloric acid were added thereto and the temperature was raised to 70° C. After 2 hours, 600 parts of HEMA was added and the volatile components were completely distilled off by means of a vacuum pump. Thus, there was obtained 884 parts, of a mixed solution of a silica polycondensate in HEMA.

Then, 0.1 part of AIBN was added to and dissolved in 200 parts of the above mixed solution. Thereafter, the mixed solution was polymerized in all the same manner as described in Example 1 to obtain a cast plate. Properties of this cast plate were evaluated and the results thus obtained are shown in Table 1.

EXAMPLE 5

A glass flask fitted with agitating blades was charged with 416 parts of tetraethoxysilane, 356 parts of methyltriethoxysilane and 800 parts of ethanol. While the contents of the flask were being stirred, 144 parts of deionized water and 4 parts of 36 wt. % hydrochloric acid were added thereto and the temperature was raised to 70° C. After 2 hours, the solvent was completely replaced by MMA in the same manner as described in Example 1, and the resulting mixture was concentrated to a total amount of 600 parts. Thus, there was obtained a mixed solution.

Then, 0.05 part of 2,2-azobis(2,4-dimethylvaleronitrile) (hereinafter abbreviated as AVN) was added to and dissolved in 200 parts of the above mixed solution. Thereafter, the mixed solution was polymerized in all the same manner as described in Example 1 to obtain a cast plate. Properties of this cast plate were evaluated and the results thus obtained are shown in Table 1.

EXAMPLE 6

A glass flask fitted with agitating blades was charged with 396 parts of tetraethoxysilane, 24.8 parts of γ-methacryloyloxypropyltrimethoxysilane and 400 parts of ethanol. While the contents of the flask were being stirred, 72 parts of deionized water and 2 parts of 36 wt. % hydrochloric acid were added thereto and the temperature was raised to 70° C. After 2 hours, the reaction solution was cooled and 0.05 part of AVN was added thereto. Then, the solvent was completely replaced by MMA in the same manner as described in Example 1, and the resulting mixture was concentrated to a total amount of 200 parts. Thus, there was obtained a mixed solution.

The resulting soft, transparent gel-like material was placed in a cell formed by a gasket and two stainless steel plates and adjusted previously so as to have a thickness of 3 mm. Subsequently, the gel-like material was polymerized at 65° C. for 4 hours and then at 130° C. for 2 hours to obtain a cast plate. Properties of this cast plate were evaluated and the results thus obtained are shown in Table 1.

EXAMPLE 7

A glass flask fitted with agitating blades was charged with 832 parts of tetraethoxysilane and 800 parts of ethanol. While the contents of the flask were being stirred, 144 parts of deionized water and 4 parts of 36 wt. % hydrochloric acid were added thereto and the temperature was raised to 70° C. After 2 hours, the reaction solution was cooled to 0° C. and slowly added dropwise to a stirred solution which had been prepared by dissolving 80 parts of titanium tetraisopropoxide in 800 parts of ethanol and had been cooled to 0° C. Thereafter, the solvent was completely replaced by MMA in the same manner as described in Example 1, and the resulting mixture was concentrated to a total amount of 800 parts. Thus, there was obtained a mixed solution.

Then, 0.1 part of AIBN was added to and dissolved in 200 parts of the above mixed solution. Thereafter, the mixed solution was polymerized in all the same manner as described in Example 1 to obtain a cast plate. Properties of this cast plate were evaluated and the results thus obtained are shown in Table 1.

EXAMPLE 8

A glass flask fitted with agitating blades was charged with 792 parts of tetraethoxysilane, 50 parts of γ-methacryloyloxypropyltrimethoxysilane and 800 parts of ethanol. While the contents of the flask were being stirred, 144 parts of deionized water and 4 parts of 36 wt. % hydrochloric acid were added thereto and the temperature was raised to 70° C. After 2 hours, 400 parts of a partial polymer of MMA (having a polymerization rate of 10% by weight) was added thereto. Then, the solvent was completely replaced by MMA in the same manner as described in Example 1, and the resulting mixture was concentrated to a total amount of 1,100 parts. Thus, there was obtained a mixed solution.

Then, 0.1 part of AIBN was added to and dissolved in 200 parts of the above mixed solution. Thereafter, the mixed solution was polymerized in all the same manner as described in Example 1 to obtain a cast plate. Properties of this cast plate were evaluated and the results thus obtained are shown in Table 1.

EXAMPLE 9

A glass flask fitted with agitating blades was charged with 832 parts of tetraethoxysilane and 800 parts of ethanol. While the contents of the flask were being stirred, 144 parts of deionized water and 4 parts of 36 wt. % hydrochloric acid were added thereto and the temperature was raised to 70° C. After 2 hours, 80 parts of methacrylic acid (hereinafter abbreviated as MAA) was added thereto. Then, MMA was added in the same manner as described in Example 1 to replace the solvent by MAA and MMA, and the resulting mixture was concentrated to a total amount of 800 parts. Thus, there was obtained a mixed solution.

Then, 0.1 part of AIBN was added to and dissolved in 200 parts of the above mixed solution. Thereafter, the mixed solution was polymerized in all the same manner as described in Example 1 to obtain a cast plate. Properties of this cast plate were evaluated and the results thus obtained are shown in Table 1.

EXAMPLE 10

A glass flask fitted with agitating blades was charged with 832 parts of tetraethoxysilane, 6.5 parts of vinyltrichlorosilane and 800 parts of ethanol. While the contents of the flask were being stirred, 144 parts of deionized water was added thereto and the temperature was raised to 70° C. After 2 hours, the solvent was completely replaced by MMA in the same manner as described in Example 1, and the resulting mixture was concentrated to a total amount of 800 parts. Thus, there was obtained a mixed solution.

Then, 0.1 part of AIBN was added to and dissolved in 200 parts of the above mixed solution. Thereafter, the mixed solution was polymerized in all the same manner as described in Example 1 to obtain a cast plate. Properties of this cast plate were evaluated and the results thus obtained are shown in Table 1.

EXAMPLE 11

A cast plate was obtained in all the same manner as described in Example 1, except that 832 parts of tetraethoxy-silane was replaced by 608 parts of tetramethoxysilane. Properties of this cast plate were evaluated and the results thus obtained are shown in Table 1.

EXAMPLE 12

A cast plate was obtained in all the same manner as described in Example 3, except that 80 parts of γ-methacrylyoloxypropyltrimethoxysilane was replaced by 59 parts of vinyltrimethoxysilane. Properties of this cast plate were evaluated and the results thus obtained are shown in Table 1.

EXAMPLE 13

A cast plate was obtained in all the same manner as described in Example 3, except that the amount of water used for the reaction was altered to 288 parts. Properties of this cast plate were evaluated and the results thus obtained are shown in Table 1.

EXAMPLE 14

A cast plate was obtained in all the same manner as described in Example 4, except that the amount of water used for the reaction was altered to 1,440 parts. Properties of this cast plate were evaluated and the results thus obtained are shown in Table 1.

Comparative Example 1

0.1 part of AIBN was dissolved in 100 parts of MMA. This mixture was polymerized in the same manner as described in Example 1 to obtain a cast plate. Properties of this cast plate were evaluated and the results thus obtained are shown in Table 1.

Comparative Example 2

While 80 part of MMA was being stirred, 20 parts of finely powdered silica (Aerosil R-972; trade name; manufactured by Japan Aerosil Co., Ltd.) having an average particle diameter of 16 nm was added thereto and uniformly dispersed therein to obtain a dispersion of finely powder silica. When finely powdered silica was added in greater amounts, the resulting dispersion showed a marked increase in viscosity and could not be subjected to subsequent operations.

Then, 0.1 part of AIBN was added to and dissolved in 100 parts of the above dispersion of finely powdered silica. This dispersion was polymerized in all the same manner as described in Example 1 to obtain a cast plate. Properties of this cast plate were evaluated and the results thus obtained are shown in Table 1.

Comparative Example 3

A cast plate was obtained in all the same manner as described in Example 1, except that 832 parts of tetraethoxysilane was replaced by 712 parts of methyltriethoxysilane. Properties of this cast plate were evaluated and the results thus obtained are shown in Table 1.

TABLE 1

| Example No. | Total light transmittance (%) | Haze (%) | HDT (°C.) | Flexural breaking strength (kg/cm$^2$) | Flexural modulus of elasticity (kg/cm$^2$) | SiO$_2$ content (wt. %) |
|---|---|---|---|---|---|---|
| Example 1 | 93.4 | 1.7 | 127 | 800 | $4.0 \times 10^4$ | 29.7 |
| Example 2 | 93.1 | 1.5 | 120 | 1,200 | $3.8 \times 10^4$ | 21.7 |
| Example 3 | 92.6 | 1.8 | 125 | 1,100 | $4.0 \times 10^4$ | 26.1 |
| Example 4 | 93.3 | 1.7 | 120 | 1,000 | $4.1 \times 10^4$ | 26.8 |

TABLE 1-continued

| Example No. | Total light transmittance (%) | Haze (%) | HDT (°C.) | Flexural breaking strength (kg/cm²) | Flexural modulus of elasticity (kg/cm²) | SiO₂ content (wt. %) |
|---|---|---|---|---|---|---|
| Example 5 | 92.1 | 1.9 | 140 | 800 | $5.2 \times 10^4$ | 39.7 |
| Example 6 | 92.0 | 2.2 | 172 | 800 | $7.2 \times 10^4$ | 58.9 |
| Example 7 | 91.6 | 2.6 | 131 | 1,000 | $4.3 \times 10^4$ | 28.8 |
| Example 8 | 92.0 | 2.5 | 115 | 1,100 | $3.7 \times 10^4$ | 21.0 |
| Example 9 | 92.0 | 2.6 | 135 | 1,000 | $4.3 \times 10^4$ | 29.7 |
| Example 10 | 91.9 | 2.8 | 124 | 1,000 | $4.0 \times 10^4$ | 29.5 |
| Example 11 | 92.8 | 1.8 | 128 | 800 | $4.2 \times 10^4$ | 29.6 |
| Example 12 | 92.0 | 2.0 | 124 | 1,000 | $4.0 \times 10^4$ | 29.2 |
| Example 13 | 92.2 | 2.0 | 129 | 1,100 | $4.8 \times 10^4$ | 28.2 |
| Example 14 | 92.0 | 2.2 | 132 | 1,000 | $5.5 \times 10^4$ | 26.6 |
| Comparative Example 1 | 93.4 | 0.4 | 92 | 1,200 | $3.0 \times 10^4$ | — |
| Comparative Example 2 | 75.5 | 29.8 | 109 | 500 | $4.4 \times 10^4$ | 21.1 |
| Comparative Example 3 | 92.1 | 2.0 | 90 | 700 | $2.6 \times 10^4$ | 29.7 |

EXAMPLE 15

A glass flask fitted with agitating blades was charged with 832 parts of tetraethoxysilane and 800 parts of ethanol. While the contents of the flask were being stirred, 144 parts of deionized water and 4 parts of 36 wt. % hydrochloric acid were added thereto, the temperature was raised to 70° C., and the stirring was continued for 2 hours to form a silica polycondensate. Then, 400 parts of HEMA was added and the stirring was continued at 70° C. for an additional 2 hours.

Thereafter, the volatile components were distilled off at 40° C. under reduced pressure by means of a rotary evaporator, and further distilled off by means of a vacuum pump. Thus, there was obtained 715 parts of a solution in HEMA of a silica polycondensate having vinyl groups as a result of replacement by HEMA.

Then, 0.2 part of AIBN was dissolved in a mixed solution composed of 100 parts of the above solution of the silica polycondensate in HEMA and 100 parts of MMA. This mixed solution was polymerized in all the same manner as described in Example 1 to obtain a colorless, transparent cast plate. Properties of this cast plate were evaluated and the results thus obtained are shown in Table 2.

EXAMPLE 16

A glass flask fitted with agitating blades was charged with 800 parts of a partial polycondensate of tetraethoxysilane (Ethyl Silicate 40; trade name; manufactured by Japan Colcoat Co., Ltd.), 400 parts of ethanol and 400 parts of HEMA. While the contents of the flask were being stirred, 144 parts of deionized water and 4 parts of 36 wt. % hydrochloric acid were added thereto, the temperature was raised to 70° C., and the stirring was continued for 2 hours.

Thereafter, the volatile components were distilled off at 40° C. under reduced pressure by means of a rotary evaporator, and further distilled off by means of a vacuum pump. Thus, there was obtained 859 parts of a solution in HEMA of a silica polycondensate having vinyl groups as a result of replacement by HEMA.

Then, 0.2 part of AIBN was dissolved in a mixed solution composed of 100 parts of the above solution of the silica polycondensate in HEMA and 100 parts of MMA. This mixed solution was polymerized in all the same manner as described in Example 1 to obtain a colorless, transparent cast plate. Properties of this cast plate were evaluated and the results thus obtained are shown in Table 2.

EXAMPLE 17

A solution in HEMA of a silica polycondensate having vinyl groups as a result of replacement by HEMA was obtained in all the same manner as described in Example 15. Then, 0.2 part of AIBN was dissolved in a mixed solution composed of 150 parts of the above solution of the silica polycondensate in HEMA and 50 parts of MMA. This mixed solution was polymerized in all the same manner as described in Example 1 to obtain a colorless, transparent cast plate. Properties of this cast plate were evaluated and the results thus obtained are shown in Table 2.

EXAMPLE 18

A solution in HEMA of a silica polycondensate having vinyl groups as a result of replacement by HEMA was obtained in all the same manner as described in Example 15. Then, 0.2 part of AIBN was dissolved in a mixed solution composed of 100 parts of the above solution of the silica polycondensate in HEMA and 100 parts of HEMA. This mixed solution was polymerized in all the same manner as described in Example 1 to obtain a colorless, transparent cast plate. Properties of this cast plate were evaluated and the results thus obtained are shown in Table 2.

EXAMPLE 19

A solution in HEMA of a silica polycondensate having vinyl groups as a result of replacement by HEMA was obtained in all the same manner as described in Example 15. Then, 0.2 part of AIBN was dissolved in 200 parts of the above solution of the silica polycondensate in HEMA. This solution was polymerized in all the same manner as described in Example 1 to obtain a colorless, transparent cast plate. Properties of this cast plate were evaluated and the results thus obtained are shown in Table 2.

EXAMPLE 20

A glass flask fitted with agitating blades was charged with 832 parts of tetraethoxysilane and 800 parts of ethanol. While the contents of the flask were being stirred, 144 parts of deionized water and 4 parts of 36 wt. % hydrochloric acid were added thereto, the temperature was raised to 70° C., and the stirring was continued for 2 hours. Thereafter, the reaction solution was cooled to 0° C. and slowly added dropwise to a stirred solution which had been prepared by dissolving 80 parts of titanium tetraisopropoxide in 800 parts of ethanol and had been cooled to 0° C. Then, 400 parts of HEMA was added thereto and the stirring was continued at 70° C. for an additional 2 hours.

Thereafter, the volatile components were distilled off at 40° C. under reduced pressure by means of a rotary evaporator, and further distilled off by means of a vacuum pump. Thus, there was obtained 672 parts of a solution in HEMA of a silica polycondensate having vinyl groups as a result of replacement by HEMA.

Then, 0.2 part of AIBN was dissolved in a mixed solution composed of 100 parts of the above solution of the silica polycondensate in HEMA and 100 parts of MMA. This mixed solution was polymerized in all the same manner as described in Example 1 to obtain a slightly yellowish cast plate. Properties of this cast plate were evaluated and the results thus obtained are shown in Table 2.

EXAMPLE 21

709 parts of a solution in MAA of a silica polycondensate having vinyl groups as a result of replacement by MAA was obtained in all the same manner as described in Example 15, except that 400 parts of MAA was used in place of 400 parts of HEMA.

Then, 0.2 part of AIBN was dissolved in a mixed solution composed of 100 parts of the above solution of the silica polycondensate in MAA and 100 parts of MMA. This mixed solution was polymerized in all the same manner as described in Example 1 to obtain a colorless, transparent cast plate. Properties of this cast plate were evaluated and the results thus obtained are shown in Table 2.

EXAMPLE 22

851 parts of a solution in MAA of a silica polycondensate having vinyl groups as a result of replacement by MAA was obtained in all the same manner as described in Example 16, except that 400 parts of MAA was used in place of 400 parts of HEMA.

Then, 0.2 part of AIBN was dissolved in a mixed solution composed of 100 parts of the above solution of the silica polycondensate in MAA and 100 parts of MMA. This mixed solution was polymerized in all the same manner as described in Example 1 to obtain a colorless, transparent cast plate. Properties of this cast plate were evaluated and the results thus obtained are shown in Table 2.

EXAMPLE 23

A solution in MAA of a silica polycondensate having vinyl groups as a result of replacement by MAA was obtained in all the same manner as described in Example 21. Then, 0.2 part of AIBN was dissolved in a mixed solution composed of 150 parts of the above solution of the silica polycondensate in MAA and 50 parts of MMA. This mixed solution was polymerized in all the same manner as described in Example 1 to obtain a colorless, transparent cast plate. Properties of this cast plate were evaluated and the results thus obtained are shown in Table 2.

EXAMPLE 24

A solution in MAA of a silica polycondensate having vinyl groups as a result of replacement by MAA was obtained in all the same manner as described in Example 21. Then, 0.2 part of AIBN was dissolved in a mixed solution composed of 100 parts of the above solution of the silica polycondensate in MAA and 100 parts of HEMA. This mixed solution was polymerized in all the same manner as described in Example 1 to obtain a colorless, transparent cast plate. Properties of this cast plate were evaluated and the results thus obtained are shown in Table 2.

EXAMPLE 25

A solution in MAA of a silica polycondensate having vinyl groups as a result of replacement by MAA was obtained in all the same manner as described in Example 21. Then, 0.2 part of AIBN was dissolved in 200 parts of the above solution of the silica polycondensate in MAA. This solution was polymerized in all the same manner as described in Example 1 to obtain a colorless, transparent cast plate. Properties of this cast plate were evaluated and the results thus obtained are shown in Table 2.

EXAMPLE 26

670 parts of a solution in MAA of a silica polycondensate having vinyl groups as a result of replacement by MAA was obtained in all the same manner as described in Example 16, except that 400 parts of MAA was used in place of 400 parts of HEMA.

Then, 0.2 part of AIBN was dissolved in a mixed solution composed of 100 parts of the above solution of the silica polycondensate in MAA and 100 parts of MMA. This mixed solution was polymerized in all the same manner as described in Example 1 to obtain a slightly yellowish cast plate. Properties of this cast plate were evaluated and the results thus obtained are shown in Table 2.

TABLE 2

| Example No. | Total light transmittance (%) | Haze (%) | HDT (°C.) | Flexural breaking strength (kg/cm$^2$) | Flexural modulus of elasticity (kg/cm$^2$) | SiO$_2$ content (wt. %) |
|---|---|---|---|---|---|---|
| Example 15 | 93.1 | 1.5 | 120 | 1,150 | $3.8 \times 10^4$ | 15.5 |
| Example 16 | 93.3 | 1.5 | 121 | 1,200 | $3.7 \times 10^4$ | 18.6 |
| Example 17 | 93.0 | 1.6 | 124 | 1,120 | $4.0 \times 10^4$ | 24.2 |
| Example 18 | 93.1 | 1.7 | 120 | 1,200 | $3.7 \times 10^4$ | 15.7 |
| Example 19 | 93.0 | 1.8 | 128 | 1,120 | $4.1 \times 10^4$ | 30.8 |
| Example 20 | 91.2 | 1.9 | 124 | 1,200 | $4.0 \times 10^4$ | 21.7 |
| Example 21 | 92.2 | 1.6 | 124 | 1,100 | $3.8 \times 10^4$ | 16.0 |
| Example 22 | 93.0 | 1.7 | 125 | 1,200 | $3.8 \times 10^4$ | 18.7 |
| Example 23 | 92.9 | 1.7 | 125 | 1,150 | $4.0 \times 10^4$ | 24.5 |
| Example 24 | 93.2 | 1.6 | 119 | 1,200 | $3.8 \times 10^4$ | 16.0 |
| Example 25 | 92.7 | 1.9 | 127 | 1,120 | $4.0 \times 10^4$ | 31.0 |

TABLE 2-continued

| Example No. | Total light transmittance (%) | Haze (%) | HDT (°C.) | Flexural breaking strength (kg/cm$^2$) | Flexural modulus of elasticity (kg/cm$^2$) | SiO$_2$ content (wt. %) |
| --- | --- | --- | --- | --- | --- | --- |
| Example 26 | 91.0 | 1.8 | 126 | 1,200 | $4.1 \times 10^4$ | 21.9 |

Thus, the present invention provides composite compositions having high transparency, thermal resistance, rigidity and toughness. These composite compositions are useful in various applications where inorganic glass has heretofore been used, such as windowpanes for houses and vehicles.

We claim:

1. A process for producing a composite composition which comprises the steps of providing a silica polycondensate (A) containing silanolic hydroxyl groups and/or alkoxy groups formed by hydrolysis and polycondensation of from 1 to 100 parts by weight of silane compound (A-1) of the general formula $$Si(OR^3)_4 \qquad (II)$$

and 0 to 99 parts by weight of a silane compound (A-2) of the general formula $$SiR^1{}_aR^2{}_b(OR^3)_d \qquad (III)$$

where $R^1$ and $R^2$ are hydrocarbon radicals of 1 to 10 carbon atoms which may contain an ether linkage or ester linkage, $R^3$ is a hydrogen atom or a hydrocarbon radical of 1 to 10 carbon atoms, a and b are whole numbers 0 to 3, and d is equal to (4—a—b) and represents a whole number of 1 to 3;

preparing a mixed solution by dissolving the silica polycondensate (A) in a radical-polymerizable compound (B') consisting essentially of at least one monomer selected from the group consisting of acrylic acid, methacrylic acid, acrylic esters and methacrylic esters, or in a partial polymer thereof;

removing any water and solvent present in said mixed solution;

casting the resulting mixed solution, and effecting a thermal radical polymerization of the mixed solution from which any water and solvent present has been removed.

2. A process for producing composite compositions as claimed in claim 1 wherein the radical polymerization of the mixed solution and further polycondensation of the silica polycondensate (A) in the mixed solution are effected concurrently.

3. A process for producing composite compositions as claimed in claim 1 wherein the radical polymerization of the mixed solution and further polycondensation of the silica polycondensate (A) in the mixed solution are effected at a temperature of 40° to 150° C.

4. A process for producing composite compositions as claimed in claim 1 wherein the mixed solution is prepared by dissolving the silica polycondensate (A) in a solvent, mixing the resulting solution with the component (B'), and then distilling off the solvent and water associated with the component (A).

5. A process for producing composite compositions as claimed in claim 1 wherein the mixed solution is prepared by dissolving the silica polycondensate (A) in a solvent to form a solution and adding the component (B') to the solution while distilling off the solvent and water therefrom.

* * * * *